(12) United States Patent
Seem (10) Patent No.: US 6,937,909 B2
(45) Date of Patent: Aug. 30, 2005

(54) PATTERN RECOGNITION ADAPTIVE CONTROLLER

(75) Inventor: John E. Seem, Glendale, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 100 days.

(21) Appl. No.: 10/612,621

(22) Filed: Jul. 2, 2003

(65) Prior Publication Data

US 2005/0004685 A1 Jan. 6, 2005

(51) Int. Cl.[7] ............................................. G05B 13/02
(52) U.S. Cl. ............................. 700/41; 700/35; 700/37; 700/45; 700/73; 318/609
(58) Field of Search ............................. 700/28, 32, 33, 700/35, 37, 40–42, 44, 45, 73; 318/561, 609, 610

(56) References Cited

U.S. PATENT DOCUMENTS

| | | | | |
|---|---|---|---|---|
| 3,906,196 | A | * 9/1975 | Spitz | ........................... 700/40 |
| 5,157,597 | A | * 10/1992 | Iwashita | ...................... 700/37 |
| 5,355,305 | A | 10/1994 | Seem et al. | |
| 5,506,768 | A | 4/1996 | Seem et al. | |
| 5,568,377 | A | * 10/1996 | Seem et al. | .................... 700/37 |
| 5,805,448 | A | * 9/1998 | Lindsay et al. | ............... 700/71 |
| 6,540,148 | B1 | 4/2003 | Salsbury et al. | |

OTHER PUBLICATIONS

Salisbury, Timothy I., "A new pulse modulation adaptive controller (PMAC) applied to HVAC Systems," Control Engineering Practice 10 (2002), pp. 1357–1370, 2002 Elsevier Science Ltd., PII:S0967–0661 (02) 00099–0, Apr. 29, 2002.

* cited by examiner

Primary Examiner—Anthony Knight
Assistant Examiner—Crystal Barnes
(74) Attorney, Agent, or Firm—Foley & Lardner LLP (57) ABSTRACT

A pattern recognition adaptive controller configured to dynamically adjust proportional gain and integral time control parameters based upon patterns that characterize the closed-loop response. The pattern recognition adaptive controller receives a sampled signal representative of the controlled variable, and determines a smoothed signal based on the sampled signal. The controller determines an estimated noise level of the sampled signal and determines if the control output and process output are oscillating quickly based on predefined criteria. The controller adjusts the gain used by the controller if the control output and process output are oscillating quickly. If the control output and process are not oscillating quickly, the controller determines whether there has been a significant load disturbance, whether there is an insignificant pattern, and/or whether the control output is saturated. Based on the results of these determinations, the controller either leaves the gain and integral time unchanged or determines new gain and integral time. The adjusted control parameters are then used to control the actuator, thereby causing the controller to affect the process.

26 Claims, 4 Drawing Sheets

PATTERN RECOGNITION ADAPTIVE CONTROLLER

FIELD OF THE INVENTION

The present invention relates to an apparatus and method for adjusting the gain and integral time parameters of a proportional-integral controller. More specifically, the present invention relates to an apparatus and method for adjusting the gain and integral time parameters of a proportional-integral controller in response to patterns in a feedback signal representative of a controlled variable.

BACKGROUND OF THE INVENTION

Single-loop feedback controllers ("controllers") are commonly employed to maintain temperature, humidity, pressure, and flow rates for heating, ventilating, and air-conditioning equipment. For example, in an air conditioning system, a controller may be used to control the flow of chilled water through a cooling coil. In such a system, the controller adjusts the water flow rate based on a feedback signal indicative of the temperature of the air discharged from the coil (the "controlled variable"). The feedback signal is generated by a sensor disposed to monitor the controlled variable.

The object of such controllers is to control the system in such a way as to maintain the controlled variable, as sensed by the feedback signal, at a desired level (the "setpoint"). For example, the controller of an air conditioning system attempts to maintain the temperature of the air discharged from the system at a specific level. When the actual temperature of the discharged air deviates from the desired temperature, the controller must appropriately adjust the flow of the chilled water to bring the actual air temperature back in line with the desired air temperature. Thus, if the feedback signal indicates that the actual air temperature is colder than the desired temperature, the controller will cause the flow rate of chilled water to decrease, which will cause the actual temperature of the discharged air to increase. Likewise, if the feedback signal indicates that the actual air temperature is warmer than the desired temperature, the controller will cause the flow rate of chilled water to increase, which will cause the actual temperature of the discharged air to decrease.

An ideal feedback control system would be able to maintain the controlled variable at the setpoint based only on the feedback signal. However, actual feedback control systems require additional inputs known as control parameters. Control parameters are values used by a controller to determine how to control a system based on the feedback signal and the setpoint.

One commonly used method for controlling a closed loop system, known as proportional plus integral control (PI), requires two control parameters: proportional gain and integral time. Since these two control parameters directly affect the performance and stability of a PI controller, it is important to determine the appropriate values of these parameters. However, the appropriate values for these parameters may change over time as the system is used. For example, the dynamics of a process may be altered by heat exchanger fouling, inherent nonlinear behavior, ambient variations, flow rate changes, large and frequent disturbances, and unusual operations status, such as failures, startup and shutdown. The process of adjusting the control parameters of a controller to compensate for such system changes is called retuning. If a controller is not retuned, the control response may be poor. For example, the controlled variable may become unstable or oscillate widely with respect to the setpoint. Thus, to insure adequate performance, controllers should be periodically retuned with new control parameter values.

The various tuning methods which have been developed to determine the appropriate values of the control parameters for PI controllers fall into three general categories. These categories are: manual tuning, auto-tuning, and adaptive control. Manual tuning methods require an operator to run different test or trial and error procedures to determine the appropriate control parameters. Manual tuning methods have the obvious disadvantage of requiring large amounts of operator time and expertise. Auto-tuning methods require an operator to periodically initiate tuning procedures, during which the controller will automatically determine the appropriate control parameters. The control parameters thus set will remain unchanged until the next tuning procedure. While auto-tuning requires less operator time than manual tuning methods, it still requires operator intervention. Further, during the interval between tunings, the controller may become severely out of tune and operate poorly. With adaptive control methods, the control parameters are automatically adjusted during normal operation to adapt to changes in process dynamics. Thus, no operator intervention is required. Further, the control parameters are continuously updated to prevent the degraded performance which may occur between the tunings of the other methods.

There are three main approaches to adaptive control: model reference adaptive control ("MRAC"), self-tuning control, and pattern recognition adaptive control ("PRAC"). The first two approaches, MRAC and self-tuning, rely on system models which are generally quite complex. The complexity of the models is necessitated by the need to anticipate unusual or abnormal operating conditions. Specifically, MRAC involves adjusting the control parameters until the response of the system to a command signal follows the response of a reference model. Self-tuning control involves determining the parameters of a process model on-line and adjusting the control parameters based upon the parameters of the process model.

With PRAC, parameters that characterize the pattern of the closed-loop response are determined after significant setpoint changes or load disturbances have occurred. The control parameters are then adjusted based upon the characteristic parameters of the closed-loop response. Some known pattern recognition adaptive controllers require an operator to enter numerous control parameters before normal operation may begin. The more numerous the operator selected control parameters, the more difficult it is to adjust the pattern recognition adaptive controller for optimal performance, and the longer it takes to prepare the pattern recognition adaptive controller for operation.

Significant advances in the art have been disclosed in commonly owned U.S. Pat. Nos. 5,355,305 and 5,506,768, the entire contents of which are incorporated herein by reference. U.S. Pat. Nos. 5,355,305 and 5,506,768 (the '305 and '768 patents) provide for a pattern recognition adaptive controller with fewer operator-specified control variables than are required by other known pattern recognition adaptive controllers. The '305 and '768 patents further provide for a pattern recognition adaptive controller with improved performance, and particularly one which performs in a near-optimal manner under a large amount of noise. The '305 and '768 patents further provide for a pattern recognition adaptive controller with a variable tune noise band which adjusts automatically to different noise levels in the process. The '305 and '768 patents also provide for a pattern recognition adaptive controller which efficiently controls a process with a reduced number of actuator adjustments, and therefore reduced energy costs, by decreasing oscillations for the controlled variable signal. The '305 and '768 patents further provide for a robust pattern recognition adaptive controller that performs relatively secure control without constraining the values of its parameters to a predetermined range. The '305 and '768 patents also provide for a pattern recognition adaptive controller with reduced resource requirements, and more particularly, which requires less memory and less computational power than previous pattern recognition adaptive controllers.

While the inventions disclosed in U.S. Pat. Nos. 5,355,305 and 5,506,768 represent significant advances in the art, it is desirable to provide a further improved method for automatically adjusting the gain and integral time of proportional-integral controllers based upon patterns that characterize the closed-loop response. In particular, it is desirable to provide a pattern recognition adaptive controller that does not detune when there are periodic load disturbances. It is also desirable to provide a pattern recognition adaptive controller that does not detune when the controller gain is extremely large compared to an optimal value. Finally, it is desirable to provide a pattern recognition adaptive controller that does not detune undersized systems that are started repeatedly.

SUMMARY OF THE INVENTION

The present invention provides an improved apparatus and method for adjusting the gain and integral time parameters of a PI controller in response to patterns in a feedback signal representative of a controlled variable. An exemplary embodiment of the present invention provides a method of dynamically adjusting the control parameters of a proportional gain and integral time controller disposed to control an actuator affecting a process. The method comprises sampling a feedback signal representative of a controlled variable of the process to generate a sampled signal, generating a smoothed signal based on the sampled signal, determining an estimated noise level of the sampled signal, determining if control output and process output are oscillating quickly based on predefined criteria, adjusting the gain used by the controller if the control output and process output are oscillating quickly, and utilizing the adjusted control parameters to control the actuator, thereby causing the controller to affect the process.

Another embodiment of the present invention provides an apparatus for dynamically adjusting control parameters of a proportional gain and integral time controller disposed to control an actuator affecting a process. The apparatus comprises means for sampling a feedback signal representative of a controlled variable of the process to generate a sampled signal, means for generating a smoothed signal based on the sampled signal, means for determining an estimated noise level of the sampled signal, means for determining if control output and process output are oscillating quickly based on predefined criteria, means for adjusting the gain used by the controller if the control output and process output are oscillating quickly, and means for utilizing the adjusted control parameters to control the actuator, thereby causing the controller to affect the process.

Another embodiment of the present invention provides a method of dynamically adjusting the control parameters of a proportional gain and integral time controller disposed to control an actuator affecting a process. The method comprises sampling a feedback signal representative of a controlled variable of the process to generate a sampled signal, generating a smoothed signal based on the sampled signal, and determining an estimated noise level of the sampled signal. In addition, the method comprises determining whether a pattern is insignificant based on a setpoint and tune band and whether the control output is saturated, determining a new gain and a new integral time and setting the gain and integral time of the controller to the new gain and new integral time if the pattern is not insignificant and the control output is not saturated, and utilizing the adjusted control parameters to control the actuator, thereby causing the controller to affect the process.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

DETAILED DESCRIPTION

Before explaining a number of preferred, exemplary, and alternative embodiments of the invention in detail it is to be understood that the invention is not limited to the details of configuration and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

Figure 1:
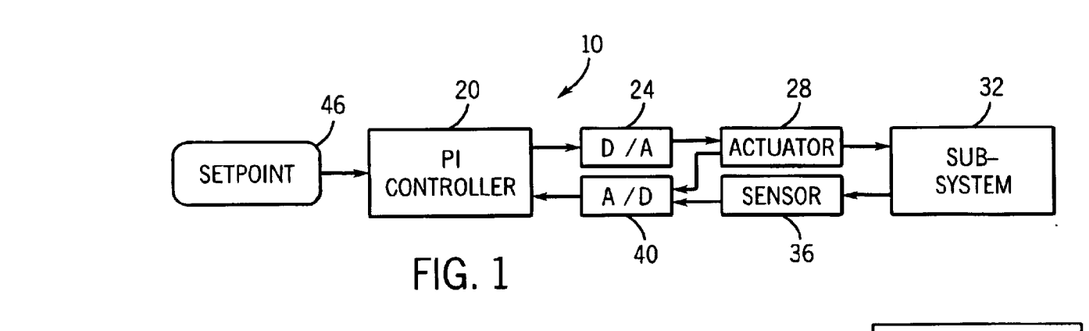
FIG. 1 is a block diagram illustrating the components of a closed loop feedback system according to an exemplary embodiment.

FIG. 1 shows the hardware configuration of a closed-loop PI control system 10 embodying the present invention. System 10 generally includes a PI controller 20, an actuator 28, a subsystem 32 which controls a process, and a sensor 36. Controller 20 is coupled to actuator 28 through a digital to analog converter 24, and to sensor 36 through an analog to digital converter 40.

Actuator 28 is disposed to affect the operation of subsystem 32. For example, subsystem 32 may be an air conditioning subsystem for which actuator 28 controls a valve through which chilled water passes. Sensor 36 is disposed to monitor the controlled variable of subsystem 32, which is affected by actuator 28. For example, sensor 36 may be a thermometer disposed to monitor the temperature of air that is discharged from subsystem 32. Sensor 36 transmits a signal representative of the controlled variable (temperature) to analog to digital converter 40. This controlled variable signal is preferably filtered by an anti-aliasing filter to remove high frequency signals as understood to those skilled in the art. Analog to digital converter 40 samples the filtered controlled variable signal and transmits a sampled feedback signal to controller 20. Controller 20 compares the sampled feedback signal to a setpoint 46, which is representative of the desired value of the controlled variable, to determine the extent to which the controlled variable has diverged from setpoint 46. Such divergences may be caused by setpoint changes or load disturbances. Based on that comparison, controller 20 determines how actuator 28 should respond to cause the controlled variable to return to setpoint 46. Once the appropriate response is determined, controller 20 generates a control signal through digital to analog converter 24 to actuator 28. According to alternative embodiments, instead of using digital to analog converter 24, any other type of output device may be used. For example, a pulse modulation adaptive controller may be substituted in place of digital to analog converter 24. In response to the control signal, actuator 28 appropriately alters the operation of subsystem 32. During this procedure, the control parameters of controller 20 are retuned to compensate for any changes in the process. Preferably, the new PI values are chosen to minimize the integrated absolute errors between setpoint 46 and the controlled variable.

A crucial factor in the efficiency and performance of system 10 is the accuracy with which controller 20 determines the new PI values after any given disturbance. A pattern recognition adaptive controller implemented in accordance with the present invention makes this determination by characterizing the closed loop response, as the response is reflected in the sampled feedback signal.

Figure 2A:
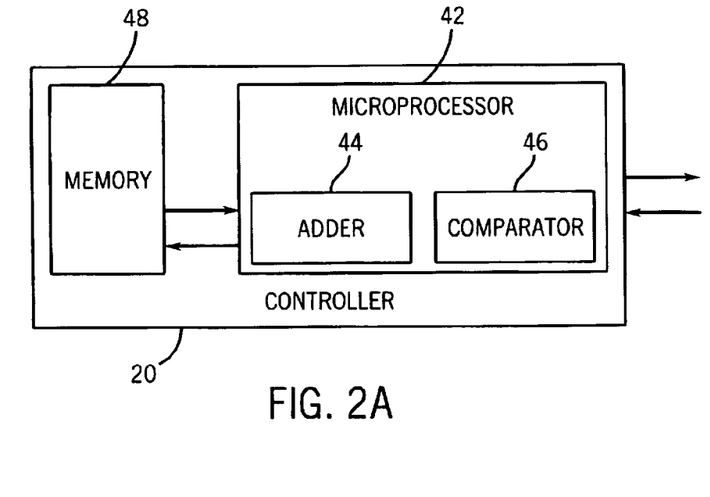
FIG. 2A is a block diagram illustrating a pattern recognition adaptive controller according to a preferred embodiment.

FIG. 2A shows pattern recognition adaptive controller 20 according to a preferred embodiment of the present invention. According to this embodiment, controller 20 internally incorporates the hardware and software required to implement the pattern recognition adaptive control process. The hardware may include a microprocessor 42 and memory 48. Microprocessor 42 includes an adder 44 and a comparator 46 and operates according to program instructions stored in memory 48. Memory 48 may be ROM, EPROM, EEPROM, RAM, or flash loaded with the appropriate instructions, or any other digital information storage means.

Figure 2B:
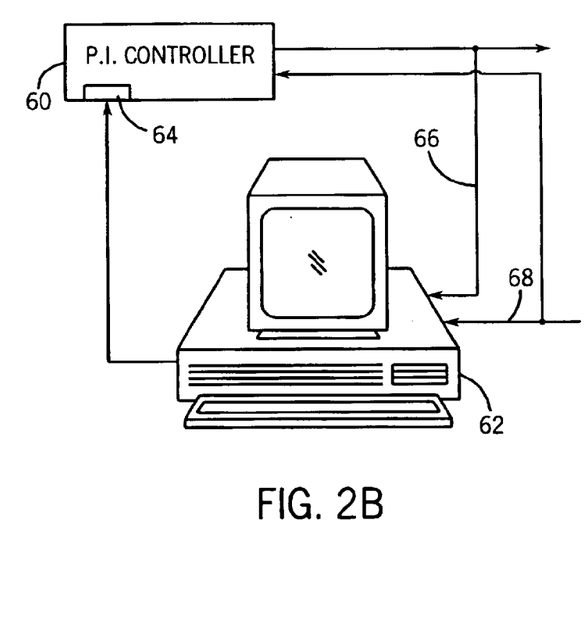
FIG. 2B is a block diagram illustrating a pattern recognition adaptive controller according to alternative embodiment.

FIG. 2B shows an alternative embodiment of the present invention. According to this embodiment, the process of determining optimal control parameter values is implemented by an external processing unit 62, such as a personal computer. The processing unit 62 is connected to a PI controller 60 through an interface 64, such as a serial port. The processing unit 62 receives the control signal generated by controller 60 via a line 66 and the feedback signal from sensor 36 via a line 68. Based on these signals, processing unit 62 determines the optimal control parameters for controller 60. These parameters are then transmitted to controller 60 through interface 64. External processing unit 62 may be connected to controller 60 to provide continuous parameter retuning, or may be connected thereto from time to time to provide retuning on a periodic basis. When processing unit 62 is not connected to controller 60, the operating parameters of controller 60 remain constant at the values generated by processing unit 62 during the most recent retuning operation. A more detailed description of a preferred embodiment of the present invention will now be made with reference to FIG. 3.

Figure 3:
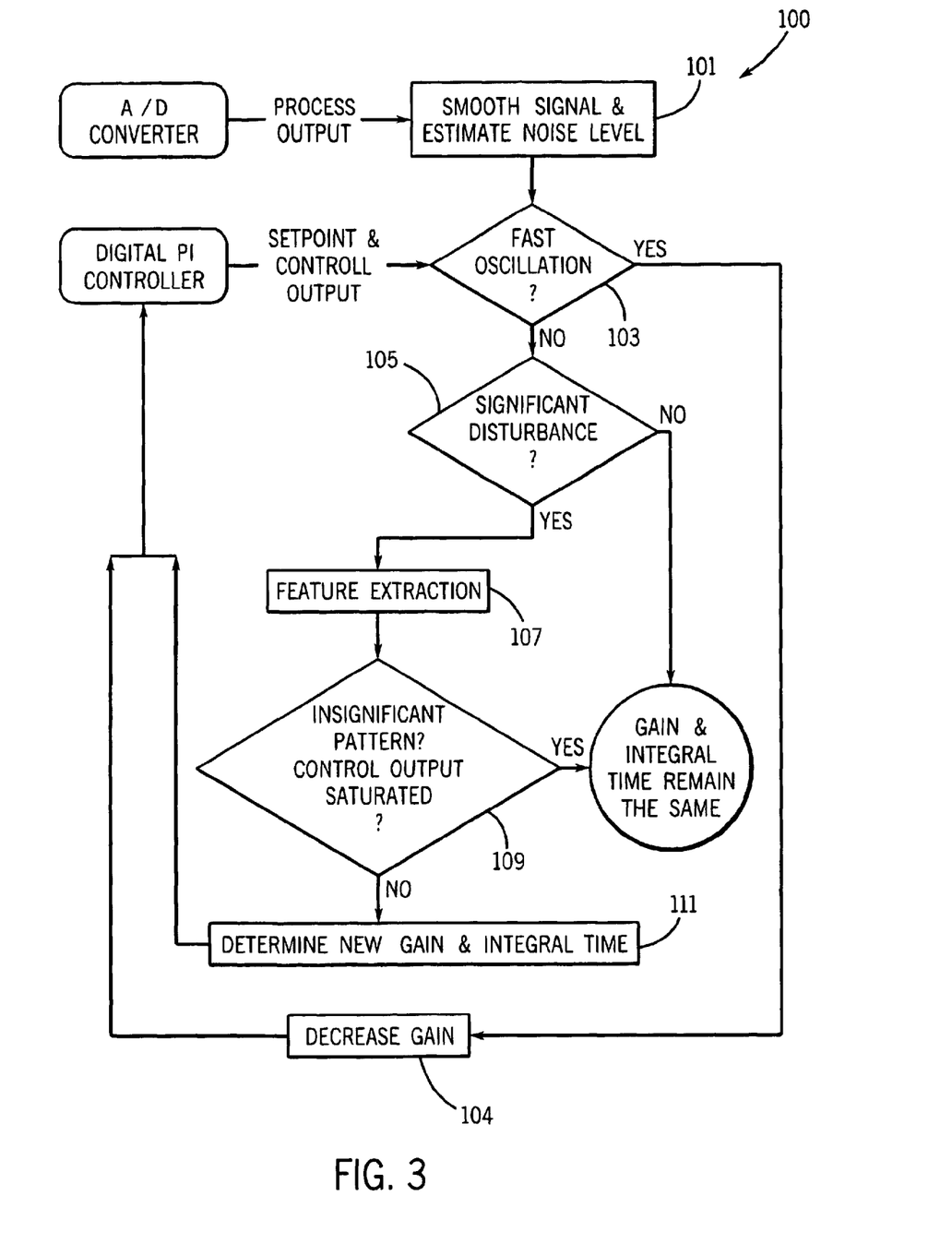
FIG. 3 is a flow diagram illustrating the manner in which the controller of FIG. 1 may be implemented for dynamically adjusting control parameters according to an exemplary embodiment of the present invention.

FIG. 3 is a block diagram for a system 100 (known as "PRAC+") in accordance with a preferred embodiment of the present invention. The implementation of system 100 generally comprises block 101 for smoothing the sampled feedback signal and estimating a noise level, block 103 for determining if the control output and process output are oscillating quickly, block 105 for determining whether a significant load disturbance has occurred, block 107 for characterizing a closed loop response, block 109 for determining whether a pattern is insignificant and whether the actuator is saturated, block 111 for determining a new gain and new integral time, and block 104 for decreasing gain.

In block 101, a smoothed signal is estimated from the sampled feedback signal 102 provided by A/D converter 40. The smoothed process output is determined from:

$$\hat{y}_{t-2} = \frac{1}{70}(-6y_t + 24y_{t-1} + 34y_{t-2} + 24y_{t-3} - 6y_{t-4}) \quad (1)$$

where $\hat{y}_{t-2}$ is the estimate of the process output at time t-2, $y_t$ is the process output at time t, $y_{t-1}$ is the process output one time period prior to time t, $y_{t-2}$ is the process output two time periods prior to time t, $y_{t-3}$ is the process output three time periods prior to time t, and $y_{t-4}$ is the process output four time periods prior to time t. Equation (1) is based on fitting a quadratic function through five evenly spaced points. The smoothed estimate of the slope $\hat{s}_{t-3}$ of a signal three time periods prior to time t is determined with:

$$\hat{s}_{t-3} = \frac{1}{28T}(3y_t + 2y_{t-1} + y_{t-2} - y_{t-4} - 2y_{t-5} - 3y_{t-6}) \quad (2)$$

where T is the sampling period for PI Controller, $y_{t-5}$ is the process output five time periods prior to time t, and $y_{t-6}$ is the process output six time periods prior to time t. Equation (2) is based upon fitting a quadratic function through seven points. Block 101 uses an estimate of process noise to determine a tune band and a signal-to-noise ratio. The estimate of the process noise at time t is determined from the exponential weighted moving average ("EWMA")

$$\bar{n}_t = \bar{n}_{t-1} + \lambda(|\hat{y}_t - y_t| - \bar{n}_{t-1}) \quad (3)$$

where $\bar{n}_{t-1}$ is the previous noise estimate and $\lambda$ is a smoothing constant that equals 0.001. A convenient method for starting up the EWMA is to recursively compute the average $\bar{n}_t$ for the first $1/\lambda$ samples with:

$$\bar{n}_t = \bar{n}_{t-1} + \frac{1}{r}(|\hat{y}_t - y_t| - \bar{n}_{t-1}) \quad (4)$$

where r is a running index on the number of sampling periods used in the noise estimate.

In block 103, a determination is made whether the control output and process output are oscillating quickly. Large and quick oscillations in the control output and process output can be caused by excessive values for the controller gain. To determine if the control output and process output are oscillating quickly, block 103 determines the following features (e.g., predefined criteria) from 12 samples of the error and control output: number of extremes for control signal and error, maximum value of low extremes for control signal and error, and minimum value of high extremes for the control signal and error. The error e equals the difference between the setpoint and process output and is determined from:

$$e = y_{set} - y \quad (5)$$

where $y_{set}$ is the setpoint. The following rules are used to identify extremes in the error:

IF $e_{t-1} > e_t$ and $e_{t-1} \geq e_{t-2}$ THEN $e_{t-1}$ is high extreme

IF $e_{t-1} < e_t$ and $e_{t-1} \leq e_{t-2}$ THEN $e_{t-1}$ is low extreme  (6)

where $e_t$ is the error at time t, $e_{t-1}$ is the error at one sampling period prior to time t, and $e_{t-2}$ is the error at two sampling periods prior to time t. Similar rules are used to determine extremes in the control signal.

Block 103 uses the following rule to determine if the error and control signal have fast oscillations:

IF $[n_{extreme,error} \geq 4$ and $n_{extreme,u} \geq 4$ and $$\max\{e_{low,1}, e_{low,2}, \ldots\} < 0 \text{ and } \min\{e_{high,1}, e_{high,2}, \ldots\} > 0 \text{ and}$$

$$(\min\{u_{high,1}, u_{high,2}, \ldots\} - \max\{u_{low,1}, u_{low,2}, \ldots\}) > 0.1(u_{max} -$$

$$u_{min})] \text{THEN fast oscillations in error \& control signal} \quad (7)$$

where $n_{extreme,error}$ is the number of extremes in the error, $n_{extreme,u}$ is the number of extremes in the control signal, $e_{low,1}$ is the first low extreme in the error, $e_{low,2}$ is the second low extreme in the error, $e_{high,1}$ is the first high extreme in the error, $u_{high,1}$ is the first high extreme in the control signal, $u_{high,2}$ is the second high extreme in the control signal, $u_{low,1}$ is the first low extreme in the control signal, $u_{low,2}$ is the second low extreme in the control signal, $u_{max}$ is the maximum value of the control signal, and $u_{min}$ is the minimum value of the control signal.

If the process output and control signal are oscillating quickly as determined from rule (7), then the ratio of new controller gain ($K_{new}$) to present controller gain (K) is determined from:

$$\frac{K_{new}}{K} = 1 - 0.5 \left( \frac{\min\{u_{high,1}, u_{high,2}, \ldots\} - \max\{u_{low,1}, u_{low,2}, \ldots\}}{u_{max} - u_{min}} \right) \quad (8)$$

At times, random noise can cause a fast oscillation to be incorrectly identified. To slow down the adjustment of gain in the presence of random noise, the 11 historical values for the error are set to zero after fast oscillations in the process output and control signal are identified. If the control output and process output are not oscillating quickly, system 100 advances to block 105. If the control output and process output are oscillating quickly, a new gain value is determined at block 104 according to equation (8) above.

At block 105, system 100 characterizes the closed loop response after a large setpoint change or load disturbance has occurred. A setpoint change greater than the tune band is considered large. If the pattern for a setpoint change is not being characterized, then block 105 searches for large load disturbances. A load disturbance is considered large when the smoothed process output is greater than the setpoint plus tune band for two consecutive samples, or the smoothed process output is less than the setpoint minus tune band for two consecutive samples. The tune band $T_{band}$ is determined from:

$$T_{band} = \max\{5.33\bar{n}_t, T_{band,min}\} \quad (9)$$

where $\bar{n}_t$ is the average noise level as determined from equations (3) and (4), and $T_{band,min}$ is a minimum tune band. The constant 5.33 was determined from optimizations that were designed to minimize the integrated absolute value of the error for a wide range of systems as is known in the art. The minimum tune band $T_{band,min}$ can be estimated with:

$$T_{band,min} = \max\{4P_{range}R_{D-A}, 4S_{range}R_{A-D}\} \quad (10)$$

where $P_{range}$ is the maximum expected range of the process output, $R_{D-A}$ is the resolution of the digital to analog converter, $S_{range}$ is the sensor range, and $R_{A-D}$ is the resolution of the analog to digital converter. The minimum tune band prevents system 100 from tuning limit-cycle oscillations caused by quantization. If no large setpoint change or load disturbance occurs, the gain and integral time remain the same. If there is a large setpoint change or load disturbance, system 100 advances to block 107.

At block 107, system 100 characterizes the closed loop response by determining the following seven features from the control signal, smoothed process output and slope of the process output: low controller output ($u_{low}$), high controller output ($u_{high}$), low smoothed process output ($\hat{y}_{low}$), high smoothed process output ($\hat{y}_{high}$), oscillation ratio ($\phi$), closed loop response time ($\theta$), and an indication of overshoot. The oscillation ratio is a measure of the amount of oscillation; the closed loop response time is a measure of the speed of response; and an overshoot indicator is used to signify the presence of overshoot. Rules and equations are needed to determine the features for both load disturbances and setpoint changes and for different types of responses, e.g., underdamped, overdamped, and unstable response types. Next, a method for determining key signals and features following a setpoint change and load disturbance is described. Then, the procedure for generating the oscillation ratio, closed loop response time, and overshoot indicator from the key signals is described.

Figure 4A:
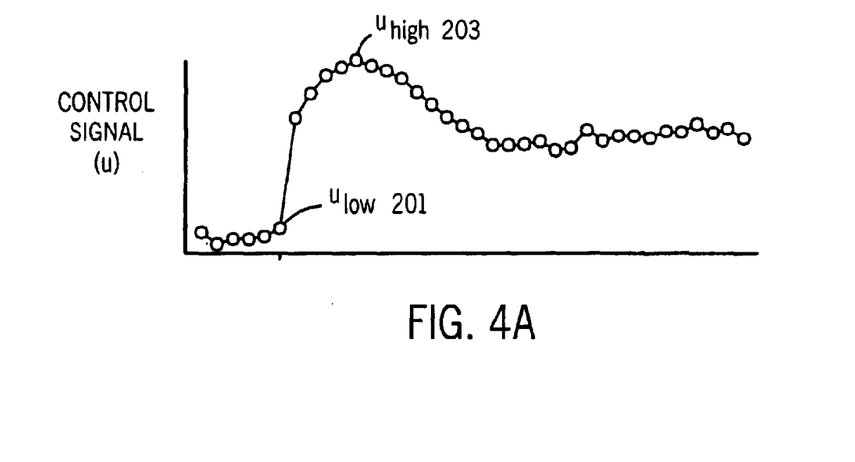
FIGS. 4A, 4B and 4C show signals used to determine features for setpoint changes with overshoot in accordance with the flow diagram of FIG. 3.
Figure 4B:
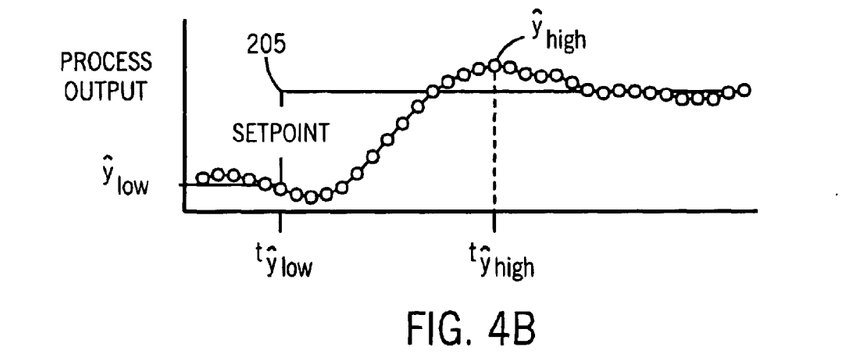
Figure 4C:
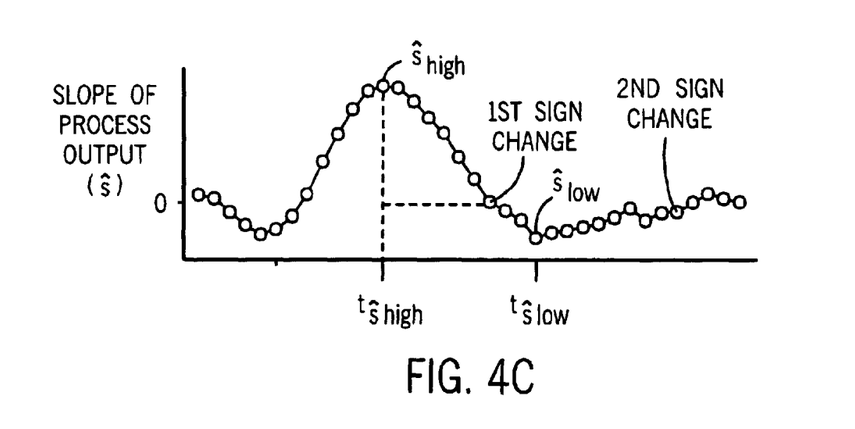

An exemplary method for extracting key signals and features following setpoint change at block 107 will now be described with reference to FIGS. 4A–4C The method begins with a search for the low 201 and high 203 control signals ($u_{low}$ and $u_{high}$). The search is initiated at the time of the setpoint change 205. The initial values for the low and high values of the smoothed process output ($\hat{y}_{low}$, $\hat{y}_{high}$) are set equal to the old setpoint ($y_{set,old}$) Also, the associated times ($\hat{t}_{ylow}$, $\hat{t}_{yhigh}$) are set equal to the time of the setpoint change. The method continues searching for signals ($\hat{y}_{low}$, $\hat{y}_{high}$, $t_{\bar{y}low}$, $t_{\bar{y}high}$) after the smoothed process output exceeds an upper threshold equal to the smoothed process output at the time of the setpoint change plus the tune band. Also, the search for low and high values of the slope ($\hat{s}_{low}$, $\hat{s}_{high}$, $t_{\hat{s}low}$, $t_{\hat{s}high}$) and sign changes in the slope begins after the smoothed process output exceeds the upper threshold. The method stops searching for signals after the slope changes sign two times, or the time since the setpoint change equals 60 times the sampling period for the PI controller, whichever occurs first.

Due to limited resolution of the analog to digital converter, the slope estimate may equal zero for a number of samples. It is important to detect a single sign change when the slope goes from a positive value to zero, and then from zero to a negative value. The following rule is used to identify a sign change in the slope:

IF ($\hat{s}_{t-1}\hat{s}_t < 0$) OR ($\hat{s}_{t-1} \neq 0$ and $\hat{s}_t = 0$) THEN sign change in slope (11)

where $\hat{s}_t$ and $\hat{s}_{t-1}$ are the current and previous estimate of the slope, respectively.

If the search for the signals and sign changes in the slope would begin before the smoothed process output exceeded the upper threshold, then the first sign change would be incorrectly identified and the oscillation ratio would have a wrong value. Thus, to prevent incorrect determination of features after an increase in setpoint, the search for signals from the process output and slope should begin after the smoothed process output exceeds an upper threshold. Following a decrease in setpoint, the search for signals begins after the smoothed process output is less than a lower threshold equal to the smoothed process output at the time of the setpoint change minus the tune band. The seven features are determined when the second sign change is identified, or the time since the setpoint change equals 60 T.

Figure 5A:
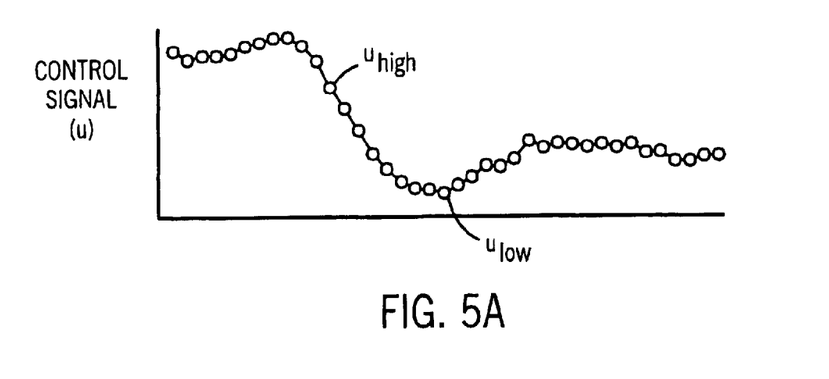
FIGS. 5A, 5B and 5C show signals used to determine features for load disturbances in accordance with the flow diagram of FIG. 3.
Figure 5B:
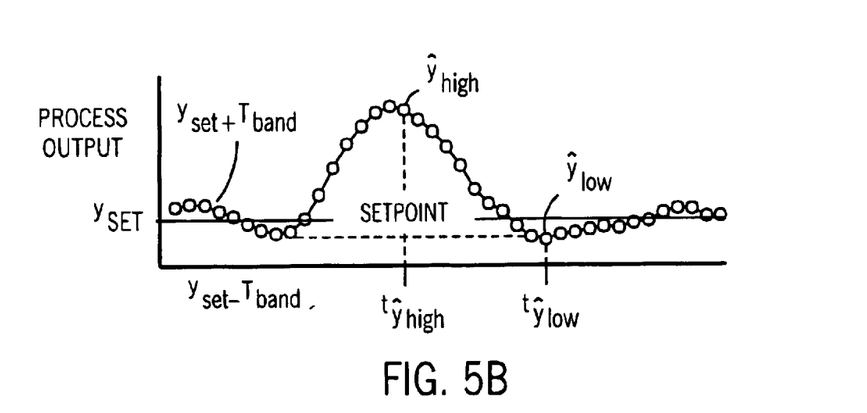
Figure 5C:
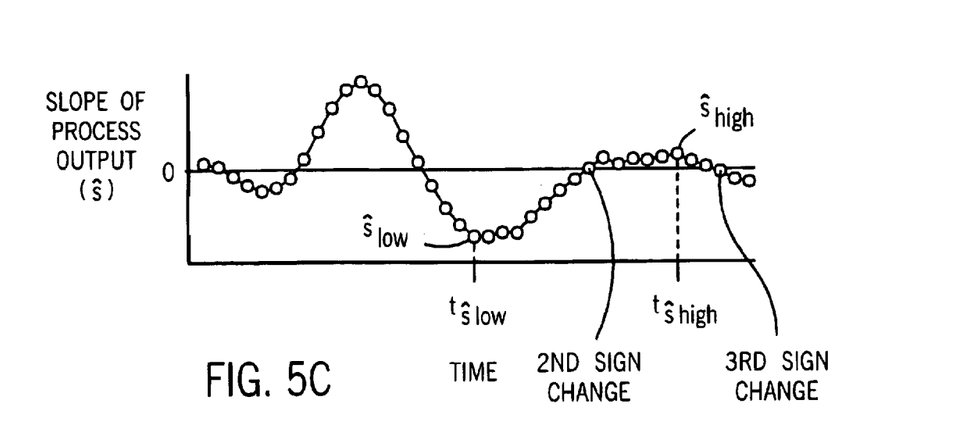

Referring now to FIGS. 5A–5C, an exemplary method will be described for searching for load disturbances when not determining features for a large setpoint change. A load disturbance is considered large when two consecutive samples of the smoothed process output are greater than the setpoint plus tune band, or two consecutive samples are less than the setpoint minus the tune band. At the time of the load disturbance, the method begins searching for low and high control signals and sign changes in the slope. After the first sign change is identified, the search for the following signals begins: $\hat{y}_{low}, \hat{y}_{high}, t_{\hat{y}}low, t_{\hat{y}}high, \hat{s}_{low}, \hat{s}_{high}, t_{\hat{s}low}, t_{\hat{s}high}$. The search for these signals stops after the slope changes sign three times, or the time since the load disturbance change is 75 times the sampling period, whichever occurs first.

If the slope does not change sign and the time since the load disturbance change is 75 times the sampling period, then the following equations are used to determine the low and high values for the smoothed process output:

$$\hat{y}_{low} = \min\{\hat{y}_{t_L+74}, \hat{y}_{t_L+75}\} \quad (12)$$

$$\hat{y}_{high} = \max\{\hat{y}_{t_L+74}, \hat{y}_{t_L+75}\} \quad (13)$$

where $\hat{y}_{t_L+74}$ and $\hat{y}_{t_L+75}$, are the smoothed process output 74 and 75 time periods after the load disturbance was identified, respectively. The indication of overshoot, oscillation ratio ($\phi$), and closed loop response time ($\theta$) are determined from the setpoint ($y_{set}$) and the following signals: $\hat{y}_{low}$, $\hat{y}_{high}$, $t_{\hat{y} \, low}$, $t_{\hat{y}high}$, $\hat{s}_{low}$, $\hat{s}_{high}$, $t_{\hat{s}low}$, and $t_{\hat{s}high}$.

Overshoot is determined by comparing the low and high values for the smoothed process output with the setpoint ($y_{set}$). There is no overshoot if the low value is greater than the setpoint ($\hat{y}_{low} > y_{set}$), or if the high value is less than the setpoint ($\hat{y}_{high} < y_{set}$).

The oscillation ratio is set to zero if any of the conditions in Table 1 (shown below) are satisfied. The first three conditions are designed to detect a sluggish closed loop response for a low noise system. The fourth condition is designed to detect a sluggish response for a system with a large amount of noise. The last three conditions are designed to detect a sluggish response for systems that have periodic load disturbances.

After block 107 characterizes the closed loop response, block 109 determines if there is an insignificant pattern or if the controller output is saturated. To prevent the control system from detuning, the controller parameters are not updated when there is an insignificant pattern. Block 109 considers a pattern insignificant when the controller output makes a small change and the smoothed process output goes between the setpoint plus tune band and the setpoint minus tune band at least once during the time that the pattern is being characterized. The change in controller output is determined by subtracting the low controller output from the high controller output. A change in controller output is considered small (or insignificant) if it involves a move of less than five percent of the range of the controller output. The range of the controller output is equal to the upper limit for the control signal minus the lower limit for the control signal. Thus, the following rule is used to determine if pattern is considered insignificant:

IF $\hat{y}_{high} \geq (y_{set} - T_{band})$ and $\hat{y}_{low} \leq (y_{set} + T_{band})$ and $(u_{high} - u_{low}) < 0.05(u_{max} - u_{min})$ THEN pattern is insignificant (16)

As indicated previously, the output of the PI controller can become saturated (e.g., have a continuous output of 0% or 100%) after a large disturbance in which the load exceeds the range of the process. Also, the controller output can saturate if system 100 does not have knowledge that the PI controller is in a manual mode of operation. If the controller output saturates and the load cannot be met, then the gain and integral time of the PI controller are not updated because the controller is doing all it can to move the process output

TABLE 1

Conditions where oscillation ratio equals zero.

| Condition Number | Condition | Comment |
|---|---|---|
| 1 | $\hat{s}_{low}$ and $\hat{s}_{high}$ not determined | Sluggish response |
| 2 | $\hat{s}_{low} \geq 0$ | Sluggish response |
| 3 | $\hat{s}_{high} \leq 0$ | Sluggish response |
| 4 | No overshoot & $(\hat{y}_{high} - \hat{y}_{low}) > 2T_{band}$ | Sluggish response & noisy |
| 5 | No overshoot & $t_{\hat{s}_{high}} > t_{\hat{s}_{low}}$ & $\left\|\dfrac{\hat{y}_{high} - y_{set}}{\hat{y}_{low} - y_{set}}\right\| > 0.5$ | Sluggish & periodic disturbance |
| 6 | No overshoot & $t_{\hat{s}_{low}} > t_{\hat{s}_{high}}$ & $\left\|\dfrac{\hat{y}_{low} - y_{set}}{\hat{y}_{high} - y_{set}}\right\| > 0.5$ | Sluggish & periodic disturbance |
| 7 | No overshoot for three consecutive patterns | Sluggish & periodic disturbance |

If none of the conditions in Table 1 are satisfied, then the oscillation ratio and closed loop response time are determined from:

$$\phi = \begin{cases} \min\left(1, \left|\dfrac{\hat{s}_{low}}{\hat{s}_{high}}\right|\right) & \text{when } t_{\hat{s}_{low}} > t_{\hat{s}_{high}} \\ \min\left(1, \left|\dfrac{\hat{s}_{high}}{\hat{s}_{low}}\right|\right) & \text{when } t_{\hat{s}_{high}} > t_{\hat{s}_{low}} \end{cases} \quad (14)$$

$$\theta = \dfrac{\hat{y}_{high} - \hat{y}_{low}}{\max(|\hat{s}_{low}|, |\hat{s}_{high}|)} \quad (15)$$

where $\phi$ is the oscillation ratio, $\theta$ is the closed loop response time, $\hat{s}_{low}$ and $\hat{s}_{high}$ are the low and high estimates of the slope, respectively, and $\hat{y}_{low}$ and $\hat{y}_{high}$ are the low and high estimates of the process output, respectively.

towards setpoint. The strategy of not updating the controller parameters when the controller output saturates is analogous to anti-reset wind-up strategies for controllers with integral action.

Block 109 uses the following procedure to detect a saturated controller output. First, the low and high signals for the controller output are recorded during the time period that the patterns are being characterized. Second, the following rule is used to determine if the controller output is considered saturated:

IF $Ke > 0$ and $u_{low} > (0.05u_{min} + 0.95u_{max})$ OR $Ke < 0$ and $u_{high} < (0.95u_{min} + 0.05u_{max})$ THEN controller output is saturated (17)

where K is the controller gain and e is the error.

The following rule in block 109 prevents system 100 from slowly detuning undersized capacity systems that are frequently restarted: Set $u_{high}$ and $u_{low}$ in rule (17) equal to the last output of the controller for the first update of the gain and integral time following the initial start of system 100, or a restart of system 100. If the controller output is saturated, the gain and integral time value remain the same. Otherwise, system 100 advances to block 111.

At block 111, system 100 determines a new gain and integral time. The new value for the controller gain is determined from:

$$K_{new} = K + \lambda_{sn}\lambda_{ss}(\hat{K}_{opt} - K) \tag{18}$$

where $K_{new}$ is the new value for the controller gain, K is the present value for the controller gain, $\hat{K}_{opt}$ is the estimate of optimal gain, $\lambda_{sn}$ is a smoothing constant based on the size of the present pattern relative to the tune band, and $\lambda_{ss}$ is the smoothing constant based on the size of the present pattern relative to the size of previous patterns.

The optimal gain is determined in block 111 from the oscillation ratio ($\phi$) using:

$$\hat{K}_{opt} = K(1.2922 - 2.4940\phi + 4.3174\phi^2 - 4.4524\phi^3 + 1.8233\phi^4) \tag{19}$$

The smoothing constant for the signal to noise ratio is determined from:

$$\lambda_{sn} = \min\left\{\max\left\{0, \left(\frac{\frac{\sigma}{T_{band}} - 0.95}{0.32}\right)\right\}, 1\right\} \tag{20}$$

where $\sigma$ is the signal size for the present pattern. The smoothing constant for the signal size ratio is one the first four times that block 111 is used to update gain and integral time. This allows system 100 to quickly adjust the controller parameters when it is first started up. If block 111 has updated the controller parameters five or more times, then the smoothing constant for the signal size is determined from:

$$\lambda_{ss} = \min\left\{\max\left\{0, \left(\frac{\sigma}{2.19\overline{\sigma}}\right)\right\}, 1\right\} \tag{21}$$

where $\overline{\sigma}$ is an exponentially weighted moving average of past signal sizes.

If there has been overshoot (i.e., smoothed process output has crossed setpoint) in any of the last three patterns, then the signal size is determined from:

$$\sigma = \max\{\hat{y}_{high}, y_{set}\} - \min\{\hat{y}_{low}, y_{set}\} \tag{22}$$

If there has been no overshoot in the last three patterns, then the signal size is determined from:

$$\sigma = \max\{\overline{\sigma}, T_{band}, (\max\{\hat{y}_{high}, y_{set}\} - \min\{\hat{y}_{low}, y_{set}\})\} \tag{23}$$

The average signal size is determined from:

$$\overline{\sigma}_p = \overline{\sigma}_{p-1} + \lambda(\sigma_p - \overline{\sigma}_{p-1}) \tag{24}$$

where $\overline{\sigma}_p$ is the average signal size based on p patterns, $\lambda$ is an exponential smoothing constant that was set to 0.05, and $\sigma_p$ is determined from equation (22) for pattern p. For the first $1/\lambda$ patterns, the average signal size is determined from:

$$\overline{\sigma}_p = \overline{\sigma}_{p-1} + \frac{1}{p}(\sigma_p - \overline{\sigma}_{p-1}) \tag{25}$$

where p is a running index for the number of patterns that have been characterized.

When the oscillation ratio is greater than 0.02, then the response is not sluggish and a new value for the integral time is determined from:

$$T_{i,new} = T_i + \lambda_{sn}\lambda_{ss}(\hat{T}_{i,opt} - T_i) \tag{26}$$

where $$\hat{T}_{i,opt} = T \min\{30, \max\{2, (-3.429 + 1.285\theta)\}\} \tag{27}$$

where $\lambda_{sn}$ and $\lambda_{ss}$ are determined from equations (20) and (21), respectively.

It is important to note that the above-described preferred embodiments are illustrative only. Although the invention has been described in conjunction with specific embodiments thereof, those skilled in the art will appreciate that numerous modifications are possible without materially departing from the novel teachings and advantages of the subject matter described herein. Accordingly, these and all other such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present invention.

What is claimed is:

1. A method of dynamically adjusting the control parameters of a proportional gain and integral time controller disposed to control an actuator affecting a process, comprising:

sampling a feedback signal representative of a controlled variable of the process to generate a sampled signal;

generating a smoothed signal based on the sampled signal;

determining an estimated noise level of the sampled signal;

determining if control output and process output are oscillating quickly based on predefined criteria;

adjusting the gain used by the controller if the control output and process output are oscillating quickly; and utilizing the adjusted control parameters to control the actuator, thereby causing the proportional gain and integral time controller to affect the process.

2. The method of claim 1, wherein adjusting the gain comprises decreasing the gain.

3. The method of claim 1, further comprising determining whether a significant load disturbance occurred by comparing a tune noise band to the difference between a current setpoint value and the smoothed signal if the control output and process output are not oscillating quickly.

4. The method of claim 3, wherein the gain and integral time remain the same if a significant load disturbance has not occurred.

5. The method of claim 3, further comprising characterizing a closed loop response by monitoring features from a control signal, smoothed process output, and slope of the process output if a significant load disturbance occurred.

6. The method of claim 5, further comprising determining whether a pattern is insignificant based on a setpoint and tune noise band or whether the control output is saturated.

7. The method of claim 6, wherein the gain and integral time remain the same when the pattern is insignificant or the control output is saturated.

8. The method of claim 6, wherein a new gain and new integral time are determined when the pattern is not insignificant and the control output is not saturated.

9. The method of claim 8, wherein the new gain and new integral time are determined based on estimated optimal gain, estimated optimal integral time, current gain and integral time values used in the proportional gain and integral time controller, a signal-to-noise ratio of the sampled signal, and size of a current load disturbance or setpoint change relative to average disturbance size.

10. An apparatus for dynamically adjusting control parameters of a proportional gain and integral time controller disposed to control an actuator affecting a process, comprising:

means for sampling a feedback signal representative of a controlled variable of the process to generate a sampled signal;

means for generating a smoothed signal based on the sampled signal;

means for determining an estimated noise level of the sampled signal;

means for determining if control output and process output are oscillating quickly based on predefined criteria;

means for adjusting the gain used by the controller if the control output and process output are oscillating quickly; and means for utilizing the adjusted control parameters to control the actuator, thereby causing the proportional gain and integral time controller to affect the process.

11. The apparatus of claim 10, wherein adjusting the gain comprises decreasing the gain.

12. The apparatus of claim 10, further comprising means for determining whether a significant load disturbance occurred by comparing a tune noise band to the difference between a current setpoint value and the smoothed signal if the control output and process output are not oscillating quickly.

13. The apparatus of claim 12, further comprising means for not changing the gain and integral time values if a significant load disturbance has not occurred.

14. The apparatus of claim 12, further comprising means for characterizing a closed loop response by monitoring features from a control signal, smoothed process output, and slope of the process output if a significant load disturbance occurred.

15. The apparatus of claim 14, further comprising means for determining whether a pattern is insignificant based on a setpoint and tune noise band or whether the control output is saturated.

16. The apparatus of claim 15, further comprising means for not changing the gain and integral time values when the pattern is insignificant or the control output is saturated.

17. The apparatus of claim 15, further comprising means for determining a new gain and new integral time when the pattern is not insignificant and the control output is not saturated.

18. The apparatus of claim 16, further comprising a means for determining a new gain and new integral time based on an estimated optimal gain, estimated optimal integral time, current gain and integral time values used in the proportional gain and integral time controller, a signal-to-noise ratio of the sampled signal, and size of a current load disturbance or setpoint change relative to average disturbance size.

19. A method of dynamically adjusting the control parameters of a proportional gain and integral time controller disposed to control an actuator affecting a process, comprising:

sampling a feedback signal representative of a controlled variable of the process to generate a sampled signal;

generating a smoothed signal based on the sampled signal;

determining an estimated noise level of the sampled signal;

determining whether a pattern is insignificant based on a setpoint and tune noise band and whether the control output is saturated;

determining a new gain and a new integral time and setting the gain and integral time of the proportional gain and integral time controller to the new gain and new integral time if the pattern is not insignificant and the control output is not saturated; and utilizing the adjusted control parameters to control the actuator, thereby causing the proportional gain and integral time controller to affect the process.

20. The method of claim 19, wherein the new gain and new integral time are determined based on an estimated optimal gain, estimated optimal integral time, current gain and integral time values used in the proportional gain and integral time controller, a signal-to-noise ratio of the sampled signal, and size of a current load disturbance or setpoint change relative to average disturbance size.

21. The method of claim 19, further comprising determining whether control output and process output are oscillating quickly based on predefined criteria.

22. The method of claim 21, further comprising adjusting the gain used by the proportional gain and integral time controller if the control output and process output are oscillating quickly, wherein adjusting the gain comprises decreasing the gain.

23. The method of claim 21, further comprising determining whether a significant load disturbance has occurred by comparing a tune noise band to the difference between a current setpoint value and the smoothed signal if the control output and process output are not oscillating quickly.

24. The method of claim 23, wherein the gain and integral time remain the same if a significant load disturbance has not occurred.

25. The method of claim 24, further comprising characterizing a closed loop response by monitoring features from a control signal, smoothed process output, and slope of the process output if a significant load disturbance has occurred.

26. The method of claim 19, wherein the gain and integral time remain the same when the pattern is insignificant or the control output is saturated.

* * * * *

UNITED STATES PATENT AND TRADEMARK OFFICE
CERTIFICATE OF CORRECTION

PATENT NO.    : 6,937,909 B2
DATED         : August 30, 2005
INVENTOR(S)   : Seem It is certified that error appears in the above-identified patent and that said Letters Patent is hereby corrected as shown below:

Column 12,
Line 39, insert therefor -- proportional gain and integral time -- before "controller".

Column 13,
Line 20, insert therefor -- proportional gain and integral time -- before "controller".

Signed and Sealed this

Twenty-second Day of November, 2005

JON W. DUDAS
*Director of the United States Patent and Trademark Office*